United States Patent
Yamamoto

(10) Patent No.: US 7,233,369 B2
(45) Date of Patent: Jun. 19, 2007

(54) TELEVISION TUNER FOR BOTH ANALOG AND DIGITAL SIGNAL

(75) Inventor: Masaki Yamamoto, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 486 days.

(21) Appl. No.: 10/924,164

(22) Filed: Aug. 23, 2004

(65) Prior Publication Data

US 2005/0046749 A1 Mar. 3, 2005

(30) Foreign Application Priority Data

Aug. 26, 2003 (JP) ............................. 2003-270759

(51) Int. Cl.
*H04N 5/50* (2006.01)
(52) U.S. Cl. ...................................................... 348/731
(58) Field of Classification Search ........ 348/731–733, 348/725; 455/182.3, 190.1, 192.3, 188.1; 334/18, 30, 41, 45–48, 59, 60; *H04N 5/50*
See application file for complete search history.

(56) References Cited

U.S. PATENT DOCUMENTS 6,016,170 A * 1/2000 Takayama et al. .......... 348/731

7,123,309 B2 * 10/2006 Yoda .......................... 348/731

FOREIGN PATENT DOCUMENTS

| JP | 2001-111905 | 4/2001 |
| JP | 2004-056194 | 2/2004 |

* cited by examiner

*Primary Examiner*—Sherrie Hsia
(74) *Attorney, Agent, or Firm*—Brinks Hofer Gilson & Lione

(57) ABSTRACT

The intermediate frequency signal based on the analog television signal and the intermediate frequency signal based on the digital television signal can be supplied to the intermediate frequency circuit without being distorted and with characteristics needed to the transfer of the analog television signal and the digital television signal. The television tuner contains a first SAW filter 29*a* to which a first intermediate frequency signal is input, a second SAW filter 30*a* to which a second intermediate frequency signal is input, a distributor 25 inserted between the intermediate frequency amplifier 22 and the first and second SAW filters 29*a* and 30*a*. The input port of the distributor 25 is connected to the ground by a reactance element 26, and the reactance value of the reactance element 25 is switched so as to have a conjugation relationship with the reactance component of the respective input impedance of the first and second SAW filters 29*a* and 30*a*.

4 Claims, 2 Drawing Sheets

42.17MHz 45.75MHz
41.25MHz 41.6MHz 46.4MHz

TELEVISION TUNER FOR BOTH ANALOG AND DIGITAL SIGNAL

This application claims the benefit of priority to Japanese Patent Application No. 2003-270759, herein incorporated by reference.

BACKGROUND OF THE INVENTION

1. Field of the Invention

The present invention relates to a television tuner being capable of receiving both an analog signal and a digital signal.

2. Description of the Related Art

FIG. 5 illustrates a conventional television tuner. An analog television signal and a digital television signal are input to a mixer 4 sequentially through an input tuning circuit 1, a high frequency amplifier 2, and an interstage tuning circuit 3. These television signals are mixed with a local oscillating signal supplied from an oscillator 5 to the mixer 4 and are converted into an intermediate frequency signal. Here, the intermediate frequency signal based on the analog television signal is a first intermediate frequency signal and the intermediate frequency signal based on the digital television signal is a second intermediate frequency signal.

The output side of the mixer 4 is connected to an inductance element 5a, and the inductance element 5a is connected to an analog intermediate frequency circuit 13 for processing the first intermediate frequency signal via a first switch diode 6. Similarly, the inductance element 5a is also connected to a digital intermediate frequency circuit 14 for processing the second intermediate frequency signal via a switch diode 7. The first switch diode 6 and the second switch diode 7 are controlled such that the operations of ON/OFF of the two diodes are opposite to each other. In addition, the connection point between the first switch diode 6 and the analog intermediate frequency circuit 13 is grounded by a first capacitive element 8b, and the connection point between the second switch diode 7 and the digital intermediate frequency circuit 14 is grounded by a capacitive element 9b.

In this construction, upon receiving the analog television signal, the first switch diode 6 is turned on, and the first intermediate frequency signal output from the mixer 4 is input to the analog intermediate frequency circuit 13 via the first switch diode 6. At this time, a low pass filter for attenuating the intermediate frequency signal of an adjacent channel is formed by the inductance element 5a and the first capacitive element 8b. Further, since the second switch diode 7 is in the OFF state, the backward interference signal output from the digital intermediate frequency circuit 14 is not input to the analog intermediate frequency signal 13.

On the other hand, upon receiving the digital television signal, the second switch diode 7 is turned on, and the second intermediate frequency signal output from the mixer 4 is input to the digital intermediate frequency circuit 14 via the second switch diode 7. At this time, a low pass filter for attenuating the intermediate frequency signal of an adjacent channel is formed by the inductance element 5a and the second capacitive element 9b. Further, since the first switch diode 6 is in the OFF state, the backward interference signal output from the analog intermediate frequency circuit 13 is not input to the digital intermediate frequency signal 14. (For example, refer to Japanese unexamined Patent Publication No. 2001-111905 (FIG. 1))

Since the intermediate frequency signal based on the analog television signal and the intermediate frequency signal based on the digital television signal are input to the analog intermediate frequency circuit 13 and the digital intermediate frequency circuit 14 via the first switch diode 6 and the second switch diode 7, respectively, the respective intermediate frequency signals are distorted by non-linear property of the switch diode.

Further, since only the low pass filter is inserted between the mixer 4 and the analog intermediate frequency circuit 13 or the digital intermediate frequency circuit 14, the transfer characteristics suitable for the respective intermediate frequency signal cannot be obtained.

SUMMARY OF THE INVENTION

An object of the present invention is to provide a television tuner in which the intermediate frequency signal based on the analog television signal and the intermediate frequency signal based on the digital television signal can be supplied to the intermediate frequency circuit without being distorted, and with characteristics needed to the transfer of the analog television signal and the digital television signal.

In order to solve the above-mentioned problems, a television tuner comprises an intermediate frequency amplifier for receiving a first intermediate frequency signal based on an analog television signal or a second intermediate frequency signal based on a digital television signal, a first SAW filter to which the first intermediate frequency signal output from the intermediate frequency amplifier is input, a second SAW filter to which the second intermediate frequency signal output from the intermediate frequency amplifier is input, and a distributor inserted between the intermediate frequency amplifier and the first and second SAW filters, wherein the input port of the distributor is connected to ground by a reactance element, and the reactance value of the reactance element is switched so as to have a conjugation relationship with the reactance component of the respective input impedance of the first and second SAW filters.

Further, the first and second SAW filters have a capacitive input impedance, the reactance element is composed of a series circuit including a first inductance element and a first capacitive element, the resonant frequency of the series circuit is less than the frequency of the intermediate frequency signal, and a switch element is connected in parallel to the first capacitive element.

Moreover, the distributor is composed of a distributing transformer having the input port at a middle point thereof.

Also, a series resonant circuit composed of a second inductance element and a second capacitive element is connected between the output port of the intermediate frequency amplifier and the ground, and the connection point between the second inductance element and the second capacitive element is connected to the input port of the distributor.

In the present invention, since a first SAW filter to which the first intermediate frequency signal output from the intermediate frequency amplifier is input, a second SAW filter to which the second intermediate frequency signal output from the intermediate frequency amplifier is input, and a distributor inserted between the intermediate frequency amplifier and the first and second SAW filters are comprised, the input port of the distributor is connected to ground by a reactance element, and the reactance value of the reactance element is switched so as to have a conjugation relationship with the reactance component of the respective input impedance of the first and second SAW filters, the input reactance component of the SAW filter is canceled and thus the transfer characteristics thereof can become flat.

Also, since the first and second SAW filters have a capacitive input impedance, the reactance element is composed of a series circuit including a first inductance element and a first capacitive element, the resonant frequency of the series circuit is less than the frequency of the intermediate frequency signal, and a switch element is connected in parallel to the first capacitive element, the reactance value of the reactance element can be switched corresponding to the input reactance of two SAW filters by turning on/off the switch element.

Moreover, since the distributor is composed of a distributing transformer having the input port at a middle point thereof, the interference between two SAW filters is not generated.

Also, since a series resonant circuit composed of a second inductance element and a second capacitive element is connected between the output port of the intermediate frequency amplifier and the ground, and the connection point between the second inductance element and the second capacitive element is connected to the input port of the distributor, the impedance matching with the distributor can be obtained by adequately setting the ratio between the impedance of the second inductance element and the impedance of the second capacitive element.

DESCRIPTION OF THE PREFERRED EMBODIMENT

Figure 1:
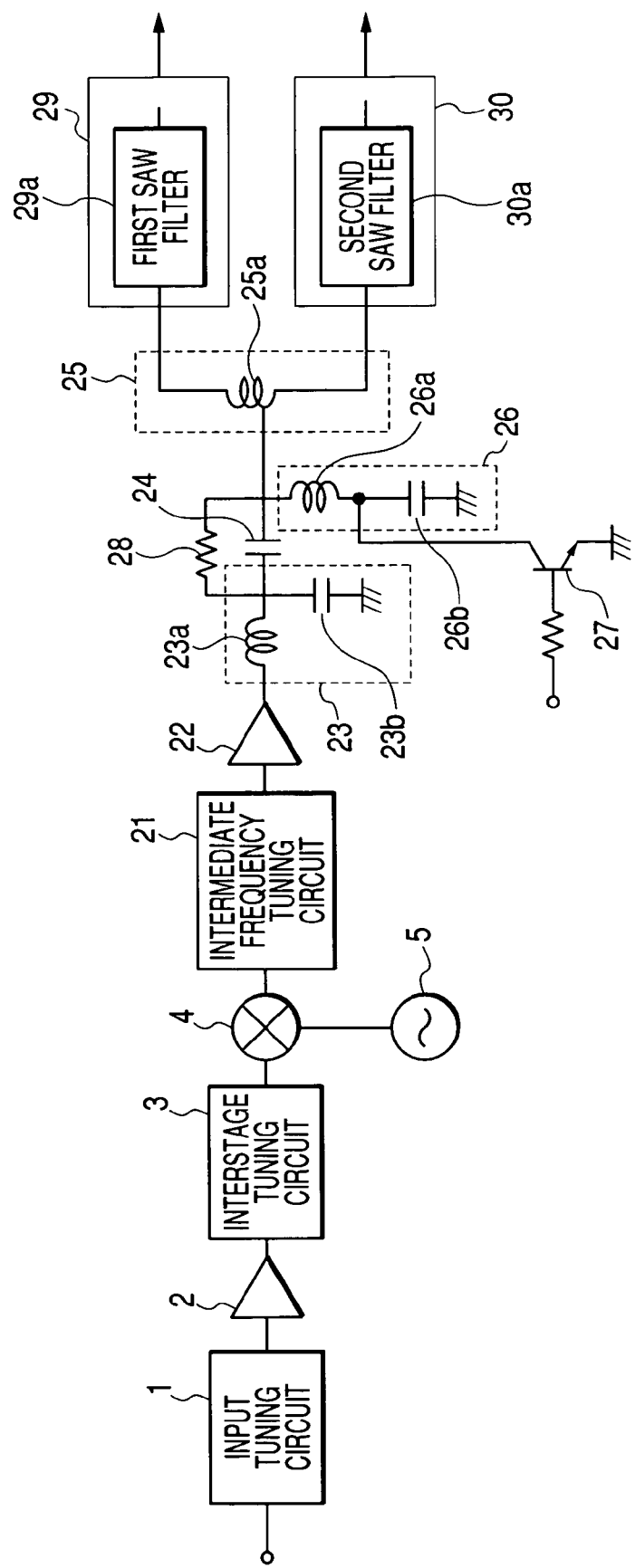
FIG. 1 is a circuit diagram illustrating the construction of a television tuner according to the present invention.

FIG. 1 illustrates a circuit of a television tuner according to the present invention. An analog television signal and a digital television signal are input to a mixer 4 through an input tuning circuit 1, a high frequency amplifier 2, and an interstage tuning circuit 3 in sequence. These television signals are mixed with a local oscillating signal supplied from an oscillator 5 to the mixer 4 and are converted into an intermediate frequency signal. Here, the intermediate frequency signal based on the analog television signal is a first intermediate frequency signal and the intermediate frequency signal based on the digital television signal is a second intermediate frequency signal.

The output side of the mixer 4 is connected in cascade to an intermediate frequency tuning circuit 21 and an intermediate frequency amplifier 22, and thus the intermediate frequency signal of an adjacent channel is attenuated by the intermediate frequency tuning circuit 21, and the intermediate frequency signal within the intermediate frequency band is amplified to a predetermined level.

The output port of the intermediate frequency amplifier 22 is grounded through a series resonant circuit 23 composed of a second inductance element 23a and a second capacitive element 23b. The series resonant circuit 23 resonates at nearly intermediate frequency band, the second inductance element 23a is provided on the side of the output port of the intermediate frequency amplifier 22, and the second capacitive element 23b is provided on the side of the ground. The connection point between the second inductance element 23a and the second capacitive element 23b is coupled to the input port of a distributor (2-distributor) 25 through a capacitive element 24 for coupling. Therefore, the impedance-matching with the distributor 25 can be accomplished by the impedance ratio between the second inductance element 23a and the second capacitive element 23b.

Moreover, a reactance element 26 composed of a series circuit including a first inductance element 26a and a first capacitive element 26b is connected between the input port of the distributor and the ground. The first inductance element 26a is connected to the distributor 25, and the first capacitive element 26b is connected to the ground. The reactance element 26 resonates at the frequency lower than the intermediate frequency band. Accordingly, it becomes inductive at the frequency higher than the intermediate frequency band.

The first capacitive element 26b is connected to a switch element 27 in parallel. The switch element 27 is composed of a transistor, where the collector is connected to the connection point between the first inductance element 26a and the first capacitive element 26b, and where the emitter is grounded. The power voltage is supplied from the output port of the intermediate frequency amplifier 22 to the transistor by a resistor 28 connected in parallel to the capacitive element 24 for coupling. In addition, the switch element 27 is controlled to be turned on when the first intermediate frequency signal is output from the intermediate frequency amplifier 22 (when receiving the analog television signal) and to be turned off when the second intermediate frequency signal is output from the intermediate frequency amplifier 22 (when receiving the digital television signal).

The distributor 25 is a distributing transformer in which a ferrite core (not shown) is wound by conducting wire 25a. One of the output ports of the distributor is connected with an analog intermediate frequency circuit 29, and the other output port is connected to a digital intermediate frequency circuit 30. The analog intermediate frequency circuit 29 has a first SAW filter 29a at the first stage thereof and process the first intermediate frequency signal. It is preferable that the first SAW filter 29a has the transfer characteristics which is nearly flat in the range of a color sub-carrier frequency of 42.17 MHz and a video intermediate frequency of 45.75 MHz and is significantly attenuated at an audio intermediate frequency of 41.25 MHz.

Figure 3:
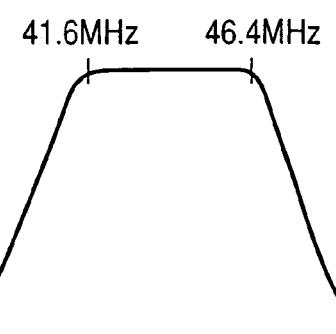
FIG. 3 illustrates ideal transfer characteristics of the SAW filter used in the television tuner according to the present invention.

The digital intermediate frequency circuit 30 has a second SAW filter 30a at the first stage thereof and deals with the second intermediate frequency signal. It is preferable that the second SAW filter 30a has flat transfer characteristics between 41.6 MHz and 46.4 MHz as illustrated in FIG. 3. This is because the modulated digital signal must be transferred over the whole band.

Figure 4:
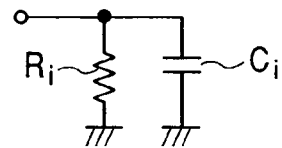
FIG. 4 is an equivalent input circuit diagram of the SAW filter used in the television tuner according to the present invention.
Figure 5:
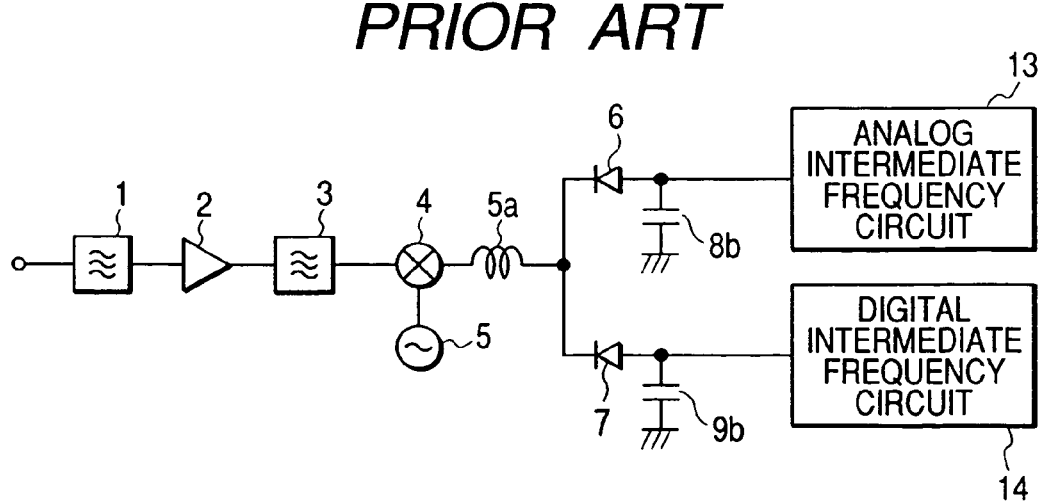
FIG. 5 is a circuit diagram illustrating the construction of a conventional television tuner.

In addition, the equivalent input impedances of the first and second SAW filters 29a and 30a are represented by a parallel circuit of a resistive component Ri and a capacitive component Ci, as illustrated in FIG. 4. That is, the input impedance is capacitive. The resistive component Ri is about 1 kΩ The capacitive component Ci is about 20 pF, but, in the transfer characteristics, the capacitive component of the first SAW filter 29a is slightly larger than that of the second SAW filter 30a.

Figure 2:
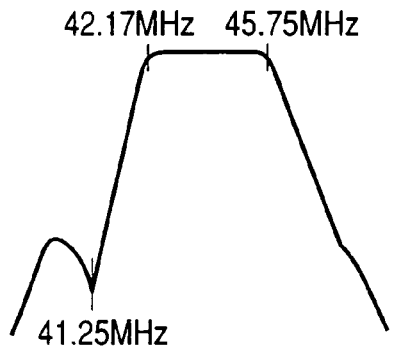
FIG. 2 illustrates ideal transfer characteristics of a SAW filter used in the television tuner according to the present invention.

In the above-mentioned construction, when the switch element 27 is turned on (when receiving the analog television signal), the reactance element 26 is composed of only the first inductance element 26a. Also, this inductance value is determined to have conjugation relationship with the equivalent capacitive component Ci of the first SAW filter 29a at the intermediate frequency band. As a result, the first SAW filter 29a becomes non-dependent on the frequency, and thus has the transfer characteristics illustrated in FIG. 2.

Further, when the switch element 27 is turned off (when receiving the digital television signal), the first capacitive element 26b is serially connected to the first inductance element 26a in the reactance element 26, and the equivalent inductance value become smaller than that of the first inductance element 26a. Also, the equivalent inductance value is determined by the first capacitive element 26b so as to have a conjugation relationship with the equivalent capacitive component Ci of the second SAW filter 30a at the intermediate frequency band. As a result, the second SAW filter 30a become non-dependent on the frequency, and thus has the transfer characteristics illustrated in FIG. 3.

In addition, since the distributor 25 is composed of a distributing transformer, two output ports are not connected to each other, and thus, the analog intermediate frequency circuit 29 and the digital intermediate frequency circuit 30 attached to the two output ports, do not affect each other.

What is claimed is:

1. A television tuner, comprising:
   an intermediate frequency amplifier to which a first intermediate frequency signal based on an analog television signal or a second intermediate frequency signal based on a digital television signal is input;
   a first SAW filter to which the first intermediate frequency signal output from the intermediate frequency amplifier is input;
   a second SAW filter to which the second intermediate frequency signal output from the intermediate frequency amplifier is input; and
   a distributor inserted between the intermediate frequency amplifier and the first and second SAW filters,
   wherein an input port of the distributor is connected to ground by a reactance element, and a reactance value of the reactance element is switched so as to have a conjugation relationship with a reactance component of the respective input impedance of the first and second SAW filters.

2. The television tuner according to claim 1, wherein the first and second SAW filters have a capacitive input impedance, the reactance element is composed of a series circuit including a first inductance element and a first capacitive element, a resonant frequency of the series circuit is less than a frequency of the intermediate frequency signal, and a switch element is connected in parallel to the first capacitive element.

3. The television tuner according to claim 1, wherein the distributor is composed of a distributing transformer having the input port at a middle point thereof.

4. The television tuner according to claim 2, wherein a series resonant circuit composed of a second inductance element and a second capacitive element is connected between an output port of the intermediate frequency amplifier and the ground, and an connection point between the second inductance element and the second capacitive element is connected to the input port of the distributor.

* * * * *